United States Patent [19]
Gottlieb et al.

[11] Patent Number: 5,181,019
[45] Date of Patent: Jan. 19, 1993

[54] WEIGHTED TRANSDUCER AND DRIVING CIRCUIT WITH FEEDBACK

[75] Inventors: Mark Gottlieb, Annandale; Tom Roche, Spotsylvania, both of Va.

[73] Assignee: Designtech International, Inc., Springfield, Va.

[21] Appl. No.: 724,932

[22] Filed: Jul. 2, 1991

[51] Int. Cl.⁵ .................. B60Q 1/26; H01L 41/04
[52] U.S. Cl. ...................... 340/474; 340/384 R; 340/384 E; 340/326; 340/815.21; 310/326; 310/327; 310/316
[58] Field of Search ............ 340/474, 384 E, 384 R, 340/326, 815.21, 815.22; 310/311, 312, 314, 316, 317, 318, 320, 321, 326, 327, 348

[56] References Cited
U.S. PATENT DOCUMENTS

| | | | |
|---|---|---|---|
| 4,195,284 | 3/1980 | Hampshire et al. | 340/384 E |
| 4,211,947 | 7/1980 | Ikeno et al. | 310/312 |
| 4,256,987 | 3/1981 | Takeuchi et al. | 310/316 |
| 4,374,377 | 2/1983 | Saito et al. | 310/324 |
| 4,376,255 | 3/1983 | Kleinschmidt | 310/317 |
| 4,386,241 | 5/1983 | Maeda . | |
| 4,654,554 | 3/1987 | Kishi | 381/158 |
| 4,658,175 | 4/1987 | Albert | 310/312 |
| 4,939,402 | 7/1990 | Hirayama et al. | 310/316 |

FOREIGN PATENT DOCUMENTS 2635304 2/1990 France .

Primary Examiner—Donnie L. Crosland
Attorney, Agent, or Firm—Oblon, Spivak, McClelland, Maier & Neustadt

[57] ABSTRACT

A sound generating device which increases the effectiveness of the sound generated by mechanically coupling a weight to a piezoelectric element. This sound generating device may find particular application in a combination backup light and sound generating device utilized in an automotive vehicle. Also, circuitry for driving a piezoelectric element at its resonant frequency when the driving signal is applied to the piezoelectric element across a step-up transformer. The circuitry features a feedback signal which detects the frequency at which the piezoelectric element is vibrating. This feedback signal is then subjected to low-pass and high-pass filtering to remove any phase shifts resulting from applying the driving signal across the step-up transformer. This filtered feedback signal is then utilized to control the driving signal.

28 Claims, 3 Drawing Sheets

WEIGHTED TRANSDUCER AND DRIVING CIRCUIT WITH FEEDBACK

BACKGROUND OF THE INVENTION

1. Field of the Invention

The present invention is directed toward a sound generating device, which may find particular application in a combination back-up light and sound generating system for use in an automobile, in which the sound generated is made more audible.

The present invention is further directed toward a circuit which can drive a transducer, such as a piezoelectric transducer, and which can drive the transducer at its resonant frequency even when a transformer is placed between the driving circuit and the transducer.

2. Discussion of the Background

Disclosed in U.S. Pat. No. 4,851,813, which is herein incorporated by reference, is a combination back-up light and sound generating device for an automobile. This device operates so that when the automobile is placed in reverse, the sound generating device will generate a sound to provide an audio indication that the vehicle is being backed up. According to this device, this sound generating device is located in the same housing as the back-up light. This device is shown and described with reference to FIGS. 1 and 2. As shown in FIGS. 1 and 2, the combination back-up light and sound generating device includes a housing 20 which can be of any shape, but is hexagonal in section in the illustrated embodiment. The housing 20 has a base 22 which is similar to the base of a standard bulb to be inserted into the tail light socket of the automobile, and also includes bayonet type projections 24 corresponding to the bayonet type projections of the standard bulb.

At the end of the housing opposite the base, the housing supports a conductive socket 26 which is electrically connected to socket 22 via wires 30a and 30b to provide electrical continuity between the tail light socket 10 and the socket 26.

An electrically operated sound generating device 32 is positioned within the housing 20. This sound generating device 32 is a piezoelectric transducer consisting of a piezoelectric ceramic material. The sound generating device operates to vibrate the surrounding air and thereby generate sound. Openings 34 are formed on top of the housing to permit the generated sound to be emitted therefrom.

This device, however, suffers from the drawback that in practice the sound pressure level outside of the tail light assembly is low, even if a loud sound is generated by the transducer. The tail light assembly lens cover creates a sealed housing which damps or muffles the generated sound. One possible solution to this problem is to use a larger piezoelectric transducer. However, this solution is not feasible since there are size constraints as to the maximum possible size of the piezoelectric transducer. Another possible solution is to increase the sound generating efficiency of a given sized transducer. If one wants to create very loud sounds using piezoelectric technology, one must drive the piezoelectric element with high voltages and at its resonant frequency. For example, 50 to 250 volts peak to peak are common for such products as the combination backup-light and sound generating device or car alarm sirens.

Each piezoelectric transducer to be utilized for such a function will have a different resonant frequency $F_O$ which is a function of its size, construction, unit to unit differences, the temperature at which it operates and other factors. To achieve the loudest sound possible at an output of a piezoelectric transducer, it is important to drive the piezoelectric transducer at its resonant frequency and to drive it with high voltages. However, each piezoelectric transducer from the same manufacturing batch differs slightly and thus has a different resonant frequency. Therefore, to drive each piezoelectric element at its resonant frequency $F_O$ to achieve the loudest possible sound, it would be necessary to "tune" each unit at the factory for the particular piezoelectric transducer enclosed therewith. This would greatly add to the cost of producing such units. Also, even if a unit is so "tuned", it may still not operate over a wide temperature variation, as the resonant frequency $F_O$ drifts due to temperature changes, thereby causing a drastic reduction in sound level outputs.

One method of solving this problem is to track the resonance of the piezoelectric transducer in real-time and to incorporate a feedback circuit to ensure that the piezoelectric transducer operates at its resonant frequency $F_O$ under all conditions. This approach will typically include the piezoelectric transducer in the signal path of an oscillator. The signal passing through the piezoelectric transducer will be greatest at its resonant frequency $F_O$ and, therefore, the oscillator should operate at that frequency. A known feedback circuit used to track the resonant frequency of a piezoelectric transducer to achieve its loudest output is shown in FIG. 6.

As shown in FIG. 6, a piezoelectric element 10 is connected at one side to ground and at the other side to two terminals P1 and P2. Terminal P1 is a main terminal which receives a driving signal to drive piezoelectric element 10. Terminal P1 is connected between the piezoelectric element 10 and a node Z1. Connected between this node Z1 and a node X1 is a capacitor C1. Also, node X1 is connected to the second terminal P2. Connected between node Z1 and a further node Y1 is an inverter amplifier A2. Located between nodes X1 and Y1 is a resistor R1. Also, located between nodes X1 and Y1, in parallel with resistor R1, is a series combination of a resistor R2 and a second inverter amplifier A1. In this way, the output of inverter amplifier A1 is used as the input into inverter amplifier A2.

The device of FIG. 6 operates in the following manner. The output of inverter amplifier A2 is attached to main terminal P1 of piezoelectric element 10. The signal for driving piezoelectric element 10 is applied to terminal P1 to thereby drive the piezoelectric element 10. As a result, the piezoelectric element 10 distorts and vibrates due to the driving signal applied thereto. A voltage produced by this distortion is then sensed by terminal P2 which is also attached to piezoelectric element 10. The voltage sensed at terminal P2 is then applied to inverter amplifier A1 through resistor R2 and is then inverted and amplified again by inverter amplifier A2 to produce an amplified replica of the original signal detected at terminal P2. The magnitude of amplification provided by amplifying inverters A1 and A2 should be chosen so as to ensure that the final signal applied to driving terminal P1 will generate oscillation in the piezoelectric element 10.

The frequency of oscillation detected by terminal P2 will be the resonant frequency of the piezoelectric element 10, as this is the frequency at which the signal passes most easily from driving terminal P1 to terminal P2. Thus, terminal P2 will sense the resonant frequency of the piezoelectric element 10 and will apply that signal, after it is amplified, to driving terminal P1 to ensure that the piezoelectric element 10 continues to oscillate at its resonant frequency. In this way, the piezoelectric element 10 will operate at the frequency at which it can output a maximum sound. The resistor R1 is provided to ensure a proper operating point and duty factor of the driving circuit. Resistor R2 protects amplifying inverter A1 from receiving an over voltage at its input. Capacitor C1 provides hysteresis, making the oscillator more efficient.

This system described with reference to FIG. 6, however, has certain drawbacks.

The amount of power transferable from the driving circuit to the mechanical vibration of the piezoelectric element 10 (this power ultimately being converted into sound) is proportional to the square of the peak-to-peak output voltage of the driving circuit and is inversely proportional to the effective resistance of the element at its resonant frequency $F_O$. If the maximum available output voltage is limited to a DC supply voltage, it may be impossible to get the full output from the driving circuit and piezoelectric element transducer assembly.

Further, when the piezoelectric element is required to be driven at very high voltages, for example, 50 to 200 volts peak-to-peak, the only way to achieve this type of voltage level from a standard 5 to 18 volt power supply circuit is to use a step-up transformer. However, the circuit shown in FIG. 6 cannot operate effectively with a step-up transformer. The problem is that the step-up transformer introduces phase shifts that result in a tendency of the complete circuit to oscillate at frequencies other than the preferred resonant frequency $F_O$. Therefore, if a transformer is used in the circuit shown in FIG. 6, terminal P2 will not sense a signal at the resonant frequency $F_O$ through the piezoelectric element and, therefore, the driving signal applied to terminal P1 will also not be at the resonant frequency $F_O$ of the piezoelectric element. Thus, the piezoelectric element will not resonate at its resonant frequency $F_O$ and therefore the piezoelectric element will not operate to produce the loudest sound possible.

SUMMARY OF THE INVENTION

Accordingly, one object of the present invention is to provide a novel vibrating structure, which may be applied to a combination back-up light and sound generating system, in which the sound pressure outside of the assembly in which it is installed, due to sound generated by this system, is made more audible.

Accordingly, a further object of the present invention is to provide a novel driving circuit for a piezoelectric element in which a step-up transformer is placed between the driving circuit and the piezoelectric element.

A further object of the present invention is to provide such a novel driving circuit which is compact in size, efficient and reliable.

A further object of the present invention is to provide such a novel driving circuit which can control the piezoelectric element to vibrate periodically to make the sound generated by the piezoelectric transducer appear more noticeable.

The present invention achieves these results by a sound generating device, which may be placed in a combination backup-light and sound generating device in which a housing has a means for mounting a light thereto and a means for mechanically and electrically connecting the housing to a vehicle tail-light assembly. This device also features a vibrating device mounted in the housing which features a piezoelectric element and a weight mechanically coupled to the piezoelectric element. Further, this weight is selected such that the housing and tail-light assembly vibrate as a single unit to generate sound and, as the entire housing and tail-light assembly vibrates as a unit, the sound generated by the system is louder. However, such a system may find application in other systems which utilize piezoelectric elements to vibrate to, thereby vibrate air, to generate sound.

Further, the present invention also features a driving circuit, which can also be implemented in a combination backup-light and sound generating device, which can ensure that a piezoelectric element or a vibrating element is efficiently driven at its resonant frequency. Such a system features a voltage source for supplying an input voltage signal to a step-up transformer which thereby amplifies this input voltage signal. A driving terminal applies this amplified voltage signal to a piezoelectric element or an element to be vibrated. A sensing terminal will also be connected to the piezoelectric element or element to be vibrated, the sensing terminal generating a feedback signal based on sensed vibrations. This feedback signal is then filtered, by a high-pass filtering operation and a low pass filtering operation, and applied to a control means for controlling the supply of the input voltage to the step-up transformer based on the filtered feedback signal. Such a system will ensure that the piezoelectric element or element to be vibrated will operate at its resonant frequency and is particularly applicable to the combination back-up light and sound generating device of the present invention. However, such a system may find use in any application where a piezoelectric element has a driving signal applied thereto across a transformer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 3:
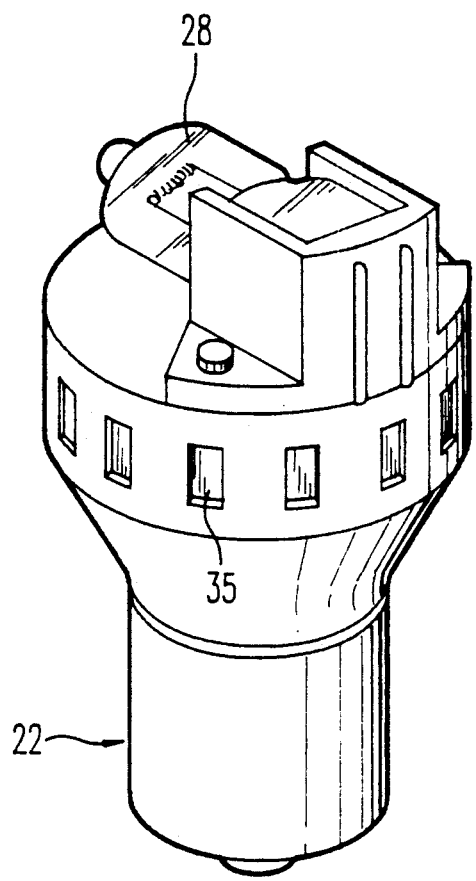
FIGS. 3 and 4 represent a combination back-up light and sound generating system according to the present invention.
Figure 4:
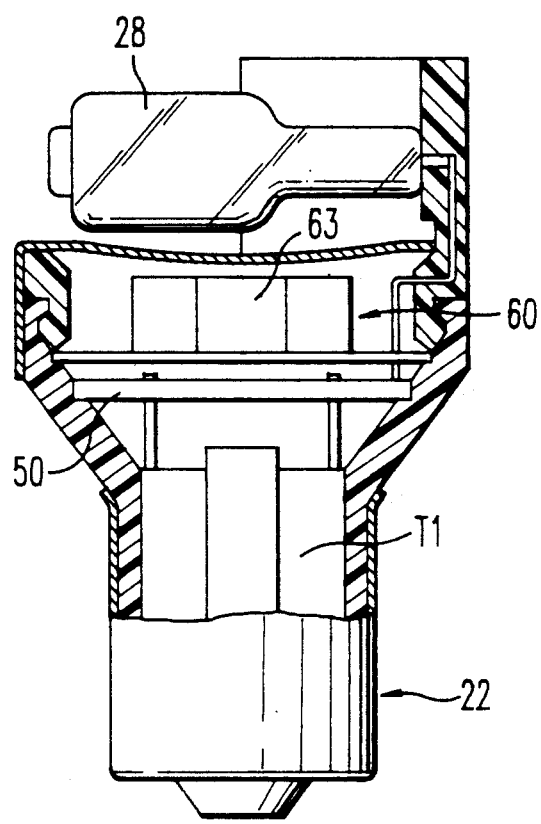
Figure 5:
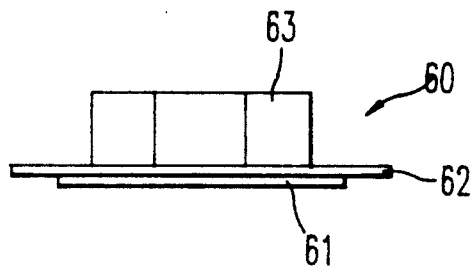
FIG. 5 represents a vibrating structure according to the present invention which may be used with the system shown in FIGS. 3 and 4.

Referring now to the drawings, wherein like reference numerals designate identical or corresponding parts throughout the several views, and more particularly to FIGS. 3-5 thereof, it is noted that FIGS. 3-5 detail an improved type of an example of a combination backup-light and sound generating system according to the present invention.

Figure 1:
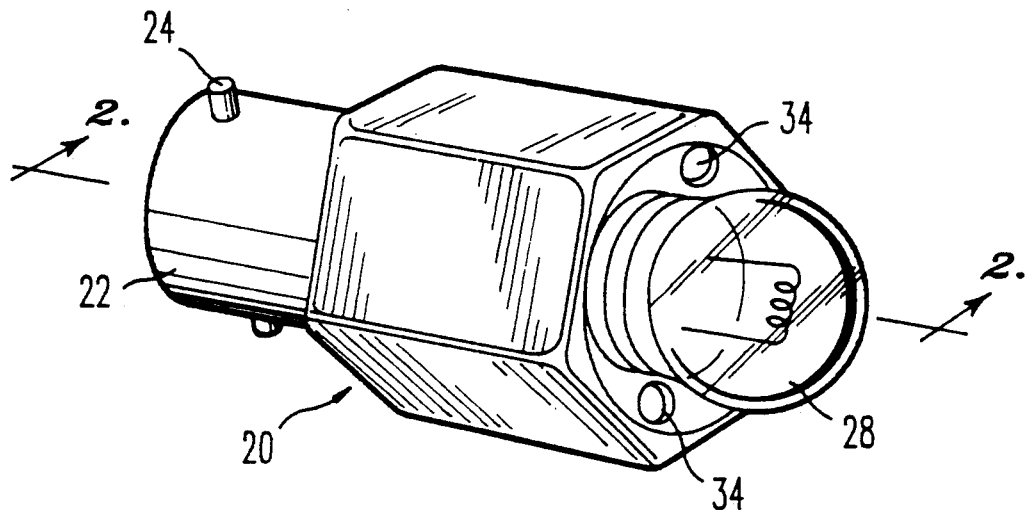
FIGS. 1 and 2 represent a combination back-up light and sound generating system disclosed in U.S. Pat. No. 4,851,813.
Figure 2:
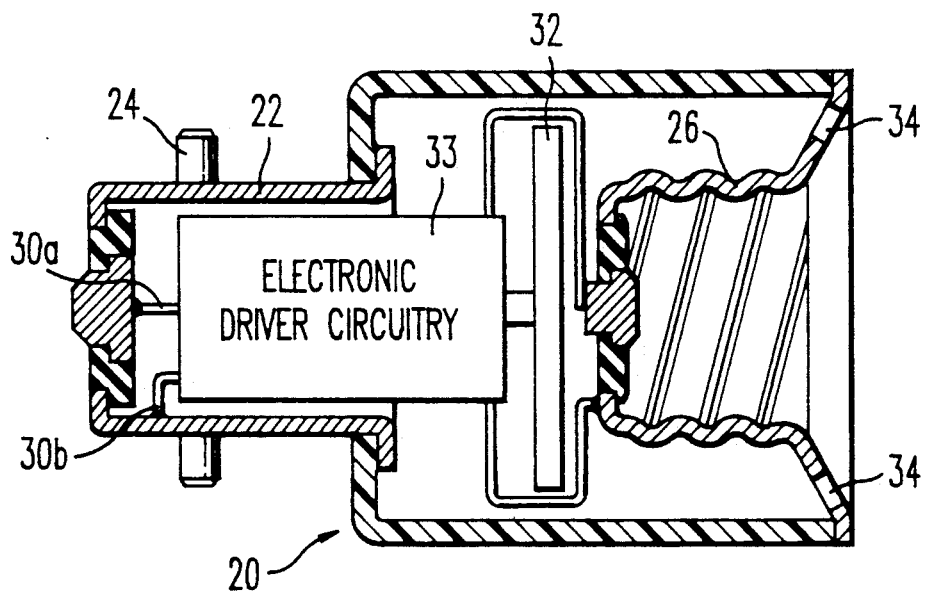
Figure 7:
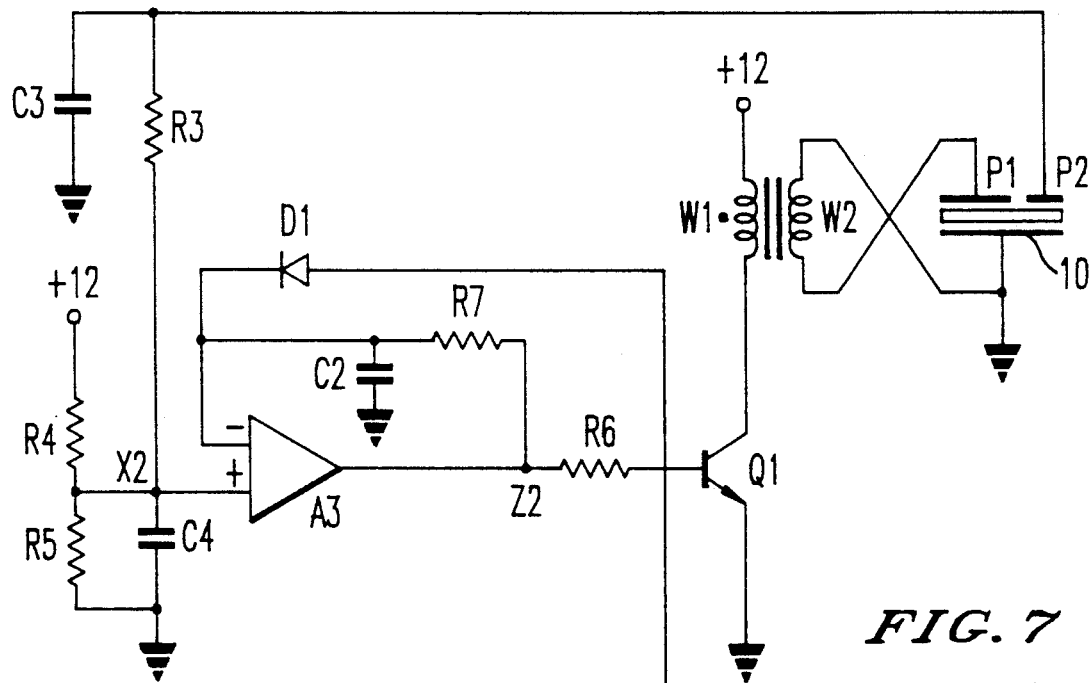
FIG. 7 represents a preferred embodiment of the driving circuit for a piezoelectric element according to the present invention.
Figure 7:
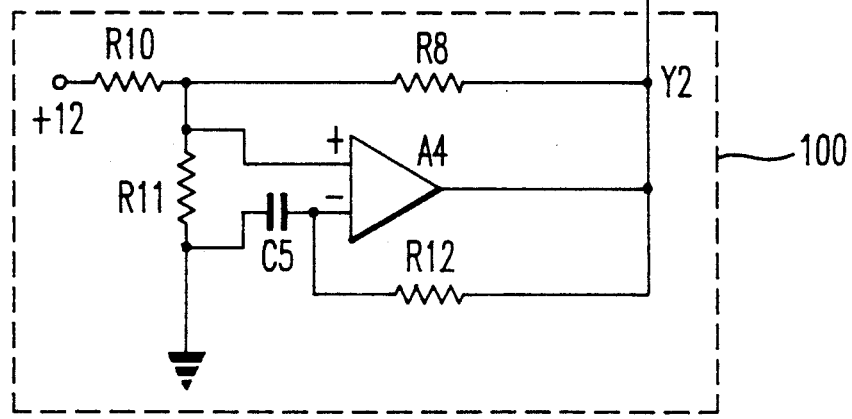

The device shown in FIGS. 3 and 4 is overall similar to the device shown in FIGS. 1 and 2 in that both devices feature a housing 22 to which a light bulb 28 is mounted. In the device disclosed in FIGS. 3 and 4, however, the light bulb 28 is mounted outside of the housing 22 in a direction perpendicular to the housing 22. Further, the device as shown in FIG. 4 features an element 50 which represents a printed circuit board on which the driving circuitry, which is more fully described below with reference to FIG. 7, is mounted. Connected to this printed circuit board 50 is a step-up transformer T1 which will step-up the voltage received from the tail light assembly to an appropriate level. Further, as shown in FIG. 4, a unique sound generating system 60, comprising a weight 63, as is more fully discussed with reference to FIG. 5, is utilized in the device shown in FIG. 4. Thus, the device shown in FIGS. 3 and 4 utilizes a different sound generating system or vibrating structure 60 than that utilized in the device of FIGS. 1 and 2.

This unique sound generating system or vibrating structure 60 is more clearly shown in FIG. 5. A conventional sound generating system will feature a stainless steel or brass plate 62 to which a ceramic piezoelectric material 61 is bonded. However, as shown in FIG. 5, according to the present invention a weight 63 is bonded to the stainless steel or brass support plate 62 on the opposite side as that where the piezoelectric material 61 is bonded. This bonding is a stiff, non-flexible bonding which can be implemented by known adhesives. For example, when utilizing a 2.5 mm diameter stainless steel or brass plate 62 with a piezoelectric material with a 16 mm diameter, a typical appropriate value for weight 63 is about 2.0 grams. Further, a weight which is hollow is particularly appropriate since the piezoelectric element bends and this shape will then minimize stress on the fastening joint area. A simple standard 12-28 hexagonal steel machine nut, which is of an appropriate shape and weight, may be used as the weight. Further, the weight is most effective if it is located in the center of the stainless steel or brass plate 62. However, the system will operate effectively if the weight is slightly off-center, and it has been found that weights which are offset by as much as 15% will operate effectively.

The addition of weight 63 operates to increase the total mass of the vibrating structure 60. As such, the addition of the weight increases the total energy that can be delivered to the vibrating structure 60. Without the weight, the piezoelectric material 61 and stainless steel or brass plate 62 will bend a predetermined amount based on a particular input voltage applied thereto. There is thus a maximum voltage which can be applied before the piezoelectric material 61 is damaged. That is, when a voltage which is too high is applied to a structure having only a piezoelectric material 61 and a stainless steel or brass plate 62, the piezoelectric material 61 will bend to point where it cracks.

However, with the addition of the weight 63, the mass of the element to be bent and vibrated is increased and therefore a larger voltage can be applied thereto before the piezoelectric material 61 will crack and become damaged.

As a result of this increased energy applied, the entire operation of the vibrating element 60 and the device in which it is installed, such as the combination back-up light and sound generator, can be changed. That is, with the addition of this weight 63, the system can change its operation so as to no longer rely on vibrating air to generate sound, as in the proposed combination back-up light and sound generating system of U.S. Pat. No. 4,851,813, which vibrates the air around the piezoelectric element and allows this sound generated thereby to pass through openings 34. As discussed above, this system is ineffective for generating sound at a loud enough level.

In addition, the resonant frequency of the vibrating structure 60 is lowered as a result of its increased mass. It is an important feature of the present invention that this makes possible an entirely different mode of sound energy transfer to outside of the tail light assembly. With the addition of the weight, the transducer can be caused to vibrate at the resonant frequency of the entire combination of the vibrating assembly and the tail light assembly, thereby efficiently transferring vibrational energy to the entire tail light assembly. It is this entire unit which then vibrates the air outside of the tail light assembly to generate sound.

Thus, no holes such as holes 34 of FIG. 1 are necessary in the present invention, since the transducer is not intended to vibrate the surrounding air. The cut-outs 35, which are shown in FIG. 3, are merely cosmetic indentations and do not form holes. Instead, in the present invention, by efficiently mechanically transferring vibrational energy directly to the entire tail light assembly via the base 22, the vibrational energy can be efficiently transferred to the air surrounding the tail light assembly.

The system described with reference to FIGS. 3-5 has been discussed with particular application to a combination back-up light and sound generating system. However, it is clear that the vibrating structure of FIG. 5 can find application in a number of devices which cause a piezoelectric element in a housing to vibrate, to thereby vibrate the air, to generate sound. For example, the system of FIG. 5 may find application in a smoke detector, car alarm siren, an underwater application, etc. That is, the system of FIG. 5 may be used in other systems to cause the entire system to vibrate as a unit, instead of causing just the piezoelectric element to vibrate independently.

One drawback of the system described above is that each back-up light and sound generating system and tail-light assembly combination will have a different resonant frequency $F_O$. The resonant frequency $F_O$ of the system will vary based on the specifics of the piezoelectric transducer used, and the specific size and shape of the housing and tail-light assembly to which the back-up light and sound generating system is inserted, as well as other factors. In order to efficiently vibrate the tail light assembly, and thereby generate as loud a sound as possible, each combination back-up light and sound generating system and tail-light assembly should be vibrated at the resonant frequency $F_O$ of the entire system. However, there is no feasible way to tune each unit to operate in such a manner. As also discussed above, up to this point no feedback system has been developed which operates effectively across a step-up transformer. Therefore, a novel driving circuit with feedback has been created to achieve this result, which is shown below in FIG. 7. This driving circuit may be implemented as the electronic driver circuitry mounted on printed circuit board 50 shown in FIG. 4.

FIG. 7 represents a preferred embodiment of the piezoelectric driving circuit according to the present invention.

Figure 6:
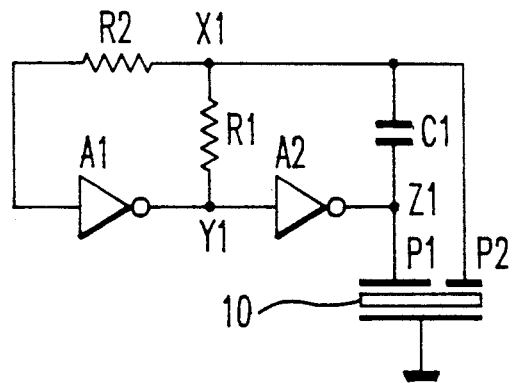
FIG. 6 represents a background art driving circuit for a piezoelectric element.

As shown in FIG. 7 is a step-up transformer T1 having a primary winding W1 and a secondary winding W2. Connected to one side of the primary winding W1 is a voltage source which is shown in this FIG. 5 as, as an example, a 12 volt power source. The other side of the primary winding W1 is connected to the collector of a transistor Q1. A first end of the secondary winding W2 is connected to a driving terminal P1, this driving terminal is connected to the piezoelectric element 10 and operates to drive the piezoelectric element 10, similarly to that described with reference to FIG. 6. This piezoelectric element 10 ma be the vibrating system 60 shown in FIG. 5 which includes the weight 63. The other end of the secondary winding W2 is connected to ground. Also connected to the piezoelectric element 10 is a sensing terminal P2.

Terminal P2 is connected to a first node X2 through a resistor R3. This first node X2 represents the positive input to an operational amplifier A3. Also, connected between terminal P2 and ground is capacitor C3. Also connected between the node X2 and ground is a parallel combination of a resistor R5 and a capacitor C4. Further, connected between this terminal X2 and a 12 voltage power source is a resistor R4.

The output of the operational amplifier A3, which is at a second node Z2, is connected through a resistor R6 to the base of the transistor Q1. A feedback loop between the node Z2 and the inverting input of the operational amplifier A3 through a resistor R7 is further provided. A capacitor C7 is connected between the negative input of the operational amplifier A3 and ground.

Further, connected between the negative input of the operational amplifier A3 and a further node Y2 is a diode D1. This node Y2 represents the output of a second operational amplifier A4. This operational amplifier A4 and the elements connected thereto represent a square wave oscillating circuit outlined in the broken box 100 in FIG. 7. This square wave oscillator circuit further features a resistor R8 connected between the positive input of operational amplifier A4 and node Y2. A resistor R10 is also connected between the positive input of operational amplifier A4 and a 12 voltage power source. A resistor R11 is connected between the positive input of the operational amplifier A4 and ground so as to also be located between the positive and negative inputs of the operational amplifier A4. A capacitor C5 is also connected between the negative input of the operational amplifier A4 and ground. Connected between the output node Y2 and the negative input of operational amplifier A4, between the negative input and capacitor C4, is a further resistor R12.

Operation of the circuit set forth in FIG. 7 will now be discussed below.

In the circuit shown in FIG. 7, the transistor Q1 will drive the primary winding W1 of transformer T1. The voltage input into the primary winding W1 of transformer T1 is stepped up by the transformer T1 and applied to the driving terminal, P1 of the piezoelectric transducer 10 through the secondary winding W2. As the voltage signal is stepped up through transformer T1, the signal incurs some unwanted phase shifts at low frequencies due to inductive shunting by the primary winding W1 of the transformer T1. The signal also incurs some unwanted phase shifts at high frequencies due to leakage inductances of the transformer T1. The circuitry of FIG. 7 is utilized to minimize the tendency of these phase shifts to offset the oscillating frequency of the piezoelectric element 10. That is, the circuitry shown in FIG. 7 operates to ensure that the piezoelectric element 10, or the entire backup-light and sound generating device and tail-light assembly unit in the case where this circuit is applied to the device shown in FIGS. 3 and 4, will vibrate at its resonant frequency $F_O$ and that the phase shifts induced by the step-up transformer T1 will not affect the piezoelectric element 10, or vibrating structure, vibrating at its resonant frequency $F_O$.

To achieve this result, the terminal P2 at the piezoelectric element 10 will sense the frequency at which the piezoelectric element 10 vibrates. This sensed frequency will then be input into amplifier A3. Because the signal sensed at terminal P2 is at a high value, the capacitor C3 is added as a shunt to reduce the signal to a manageable level. Resistor R3 and capacitor C4 operate to create a low pass filter network. The RC product that determines the roll off frequency of this network is determined principally by the effective series capacitance of C3 and C4 times the parallel combination of R3, R4 and R5. The calculated 3 dB low pass filter frequency may typically be about 800 Hz. This low pass filter will then filter out the low frequency phase shifts caused by the transformer T1. Thus, the signal input into the positive input of operational amplifier A3 will be effectively limited to the higher frequency oscillations of the piezoelectric element 10.

The output of operational amplifier A3 drives the base of transistor Q1 via a current limiting resistor R6. Transistor Q1 will drive transformer T1, to thereby close the oscillating loop.

Operational amplifier A3 also features a feedback circuit between its output and its inverting input. This feedback circuit includes a resistor R7 and a capacitor C7. Resistor R7 and capacitor C7 produce an effective high pass filter by feeding back the output of operational amplifier A3 through an RC filter to the inverting input of operational amplifier A3. The signal at the inverting input of operational amplifier A3 is rapidly driven to intercept the input feedback signal from capacitor C7, to thereby limit the time the output of operational amplifier A3 can spend in either the low or the high state. In this way, this feedback circuit for operational amplifier A3 can operate to effectively eliminate the high frequency phase shifts induced across transformer T1 and which would be sensed by sensing terminal P2. The output of operational amplifier A3 controls transistor Q1. That is, the output of operational amplifier A3 controls transistor Q1 to switch it on and off and thereby control whether the 12 volt input signal is stepped-up across transformer T1 and applied to driving terminal P1.

Thus, this circuitry operates to effectively eliminate both the high frequency and low frequency phase shifts induced by the transformer T1 and which would be sensed by terminal P2. As a result, the driving terminal P1 can correctly drive the oscillation of the piezoelectric element 10, or the entire unit to be vibrated, only at its resonant frequency $F_O$.

Further, the circuit of FIG. 7 operates to drive piezoelectric element 10, or the entire unit to be vibrated, at its resonant frequency $F_O$ as long as its resonant frequency stays within a predetermined range. For example, and as discussed below, the circuit elements may be chosen so that the driving circuit operates with a piezoelectric element or unit which has a resonant frequency between 1–4 KHz. Thus, as long as the resonant frequency $F_O$ of the piezoelectric element or unit remains within this range, then the driving circuitry of FIG. 7 will effectively drive the piezoelectric element or unit at its resonant frequency $F_O$. In this way, the driving circuitry of FIG. 7 can operate with piezoelectric elements with slightly different resonant frequencies, as naturally occurs during the manufacture of piezoelectric elements, and with different back-up light and sound generating systems being inserted into different tail-light assemblies, and can compensate for changing resonant frequencies of the piezoelectric element, resulting from, as an example, drifts in the resonant frequency from temperature changes When utilizing a piezoelectric element or structural unit with a resonant frequency of between 1 and 4 KHz, and preferably between 2 and 3 KHz, typical values for the elements shown in FIG. 7 are as follows: R3=470 K$\Omega$, R4=680 K$\Omega$, R5=680 K$\Omega$, R6=27 K$\Omega$, R7=1.5 M$\Omega$, R8=22 K$\Omega$, R10=100 K$\Omega$, R11=100 K$\Omega$, R12=2.7 M$\Omega$, C3=0.003 $\mu$F, C4=0.001 $\mu$F, C5=0.1 $\mu$F, C7=0.0033 $\mu$F. Further, A3 and A4 may be LM358's operational amplifiers, Q1 may be a NTE46 Darlington transistor and D1 may be a 1N4148 diode. By utilizing such circuit elements, the circuit shown in FIG. 2 is operational for effectively driving a piezoelectric element or structural unit at its resonant frequency $F_O$ if that resonant frequency is between 1 and 4 KHz, and preferably between 2 and 3 KHz. However, it is clearly understood that these circuit element values can be varied to operate with a piezoelectric element or structural unit which has a different resonant frequency $F_O$.

A further feature of the circuit of FIG. 7 is the wave oscillator circuitry 100. This wave oscillator circuitry 100 operates to make the sound of the vibrating piezoelectric element 10 more noticeable. In order to make the sound of the vibrating piezoelectric element 10 more noticeable, wave oscillating circuitry 100 operates to turn on and off the vibrating of piezoelectric element 10 at a period of approximately one second. By turning the piezoelectric element on and off at this rate, the time when the piezoelectric element is vibrating varies periodically and the sound induced at that point is made more noticeable.

Thus, when the output of operational amplifier A4 is high, current flows through the diode D1 to force the inverting output of operational amplifier A3 positive. As a result, the output of operational amplifier A3 is forced low. This then prevents any outputs from transistor Q1 and therefore the oscillation of the piezoelectric element 10 will stop.

This feedback circuitry of FIG. 7 has been described with particular reference to the combination backup-light and sound generating system shown in FIGS. 3–5. However, this feedback circuitry may be incorporated in any circuit which drives a piezoelectric transducer, and particularly those driving a piezoelectric transducer across a transformer.

Obviously, numerous modifications and variations of the present invention are possible in light of the above teachings. It is therefore to be understood that within the scope of the appended claims, the invention may be practiced otherwise than as specifically described therein.

What is claimed as new and desired to be secured by Letters Patent of the United States is:

1. A sound generating device coupled to a housing, wherein the sound generating device is employed in a combination back-up light and sound generating device for use with an automotive vehicle, comprising:
   a vibrating device mounted to said housing and comprising:
      a piezoelectric element; and
      a weight mechanically coupled to said piezoelectric element;
   mounting means for mounting a light to said housing and means for mechanical and electrical connection to a vehicle tail light assembly;
   wherein said weight is selected such that said vibrating device, said housing and said vehicle tail light assembly to which said housing is mechanically connected vibrate as a single unit to generate sound.

2. The sound generating device according to claim 1, mounted in a back-up light socket of a vehicle tail light assembly.

3. An apparatus for driving a piezoelectric element comprising:
   a voltage source for supplying an input voltage signal;
   a step-up transformer for receiving and amplifying said input voltage signal to thereby generate an amplified voltage signal;
   a driving terminal for receiving said amplified voltage signal and applying said amplified voltage signal to said piezoelectric element, to thereby cause said piezoelectric element to vibrate;
   a sensing terminal connected to said piezoelectric element for sensing the vibrations of said piezoelectric element and for generating a feedback signal based on said sensed vibrations;
   bandpass filtering means for bandpass filtering said feedback signal to remove unwanted phase shifts induced by said step-up transformer; and
   control means for controlling supplying said input voltage to said step-up transformer based on said filtered feedback signal.

4. The apparatus according to claim 3, wherein said bandpass filtering means comprises a low pass filter means and a high pass filter means.

5. The apparatus according to claim 4, wherein said low pass filter means comprises a RC network.

6. The apparatus according to claim 4, wherein said high pass filter means comprises a RC network connected to an inverting input of an operational amplifier.

7. The apparatus according to claim 6, wherein said control means comprises a transistor having its base connected to an output of said operational amplifier and its collector connected to a primary winding of said step-up transformer.

8. The apparatus according to claim 3, wherein said control means further comprises a square wave oscillation circuit for controlling said piezoelectric element to periodically vibrate over a predetermined time period.

9. The apparatus according to claim 8, wherein said predetermined time period is one second.

10. A method for driving a piezoelectric element comprising the steps of:
   generating an input voltage signal;
   amplifying said input voltage signal to thereby generate an amplified voltage signal;

applying said amplified voltage signal to said piezoelectric element, to thereby cause said piezoelectric element to vibrate;

sensing the vibrations of said piezoelectric element and generating a feedback signal based on said sensed vibrations;

bandpass filtering said feedback signal; and controlling supplying said amplified voltage signal to said piezoelectric element based on said filtered feedback signal.

11. The method according to claim 10, wherein said step of bandpass filtering comprises low pass filtering said feedback signal and high pass filtering said feedback signal.

12. The method according to claim 11, wherein said low pass filtering step comprises passing said feedback signal through a RC network.

13. The method according to claim 11, wherein said high pass filtering step comprises passing said feedback signal through a RC network connected to an inverting input of an operational amplifier.

14. The method according to claim 13, wherein said controlling step comprises controlling a transistor having its base connected to an output of said operational amplifier and its collector connected to a primary winding of said step-up transformer.

15. The method according to claim 10, wherein said controlling step further comprises generating a square wave oscillation signal for controlling said piezoelectric element to periodically vibrate over a predetermined time period.

16. The method according to claim 15, wherein said predetermined time period is one second.

17. A sound generating device coupled to a housing, comprising:
a vibrating device mounted to said housing and comprising:
a piezoelectric element; and
a weight mechanically coupled to said piezoelectric element;
wherein said weight is selected such that said vibrating device and said housing to vibrate as a single unit to generate sound;
a circuit for driving said vibrating device comprising:
a voltage source for supplying an input voltage signal;
a step-up transformer for receiving and amplifying said input voltage signal to thereby generate a amplified voltage signal;
a driving terminal for receiving said amplified voltage signal and applying said amplified voltage signal to said vibrating device;
a sensing terminal connected to said vibrating device for sensing the vibrations of said vibrating device and for generating a feedback signal based on said sensed vibrations;
filtering means for filtering said feedback signal to remove unwanted phase shifts induced by said step-up transformer; and
control means for controlling supplying said input voltage to said step-up transformer based on said filtered feedback signal.

18. The sound generating device according to claim 17, wherein the sound generating device is employed in a combination back-up light and sound generating device for use with an automotive vehicle and further comprising:
mounting means for mounting a light to said housing and means for mechanical and electrical connection to a vehicle tail light assembly, wherein said vibrating device, said housing and said vehicle tail light assembly to which said housing is mechanically connected vibrate as the single unit to generate sound.

19. The sound generating device according to claim 17, mounted in a back-up light socket of a vehicle tail light assembly.

20. The sound generating device according to claim 17, wherein said filtering means comprises a low pass filter means and a high pass filter means.

21. The sound generating device according to claim 20, wherein said low pass filter means comprises a RC network.

22. The sound generating device according to claim 20, wherein said high pass filter means comprises a RC network connected to an inverting input of an operational amplifier.

23. The sound generating device according to claim 22, wherein said control means comprises a transistor having its base connected to an output of said operational amplifier and its collector connected to a primary winding of said step-up transformer.

24. The sound generating device according to claim 20, wherein said control means further comprises a square wave oscillation circuit for controlling said piezoelectric element to periodically vibrate over a predetermined time period.

25. The sound generating device according to claim 24, wherein said predetermined time period is one second.

26. A sound generating device coupled to a housing comprising:
a vibrating device mounted to a mounting means and comprising:
a piezoelectric element; and
a weight mechanically coupled to said piezoelectric element,
said mounting means being rigidly mounted to the housing;
wherein said weight is selected such that said vibrating device, said mounting means and said housing vibrate as a single unit, the vibration of the housing thereby generating sound.

27. The sound generating device according to claim 26, wherein the housing is a vehicle tail light assembly and the mounting means is mechanically and electrically connected to the vehicle tail light assembly.

28. The sound generating device according to claim 27, wherein the mounting means is mounted in a light socket of the vehicle tail light assembly.

* * * * *